(12) United States Patent
Anderson et al.

(10) Patent No.: US 11,269,650 B2
(45) Date of Patent: Mar. 8, 2022

(54) PIPELINE PROTECTION FOR CPUS WITH SAVE AND RESTORE OF INTERMEDIATE RESULTS

(71) Applicant: TEXAS INSTRUMENTS INCORPORATED, Dallas, TX (US)

(72) Inventors: Timothy D. Anderson, University Park, TX (US); Duc Bui, Grand Prairie, TX (US); Joseph Zbiciak, San Jose, CA (US); Reid E. Tatge, Los Altos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/685,747

(22) Filed: Nov. 15, 2019

(65) Prior Publication Data

US 2020/0210198 A1 Jul. 2, 2020

Related U.S. Application Data

(60) Provisional application No. 62/786,374, filed on Dec. 29, 2018.

(51) Int. Cl.
*G06F 9/38* (2018.01)

(52) U.S. Cl.
CPC .......... *G06F 9/3867* (2013.01); *G06F 9/3838* (2013.01)

(58) Field of Classification Search
CPC .... G06F 9/3838; G06F 9/3869; G06F 9/3867; G06F 9/3863; G06F 9/3861; G06F 9/00–3897; G06F 15/00–825
See application file for complete search history.

(56) References Cited

U.S. PATENT DOCUMENTS

| | | | | | |
|---|---|---|---|---|---|
| 5,961,630 | A * | 10/1999 | Zaidi | ...................... | G06F 9/3834 712/200 |
| 5,987,594 | A * | 11/1999 | Panwar | ............... | G06F 9/30043 712/205 |
| 6,957,325 | B1 * | 10/2005 | Chang | ................. | G06F 11/3604 712/226 |
| 2006/0090061 | A1 * | 4/2006 | Akkary | ................... | G06F 9/384 712/214 |
| 2009/0049280 | A1 * | 2/2009 | Tatge | .................... | G06F 9/3867 712/219 |
| 2014/0053008 | A1 * | 2/2014 | Rozas | ................... | G06F 9/3824 713/322 |

* cited by examiner

*Primary Examiner* — Keith E Vicary
(74) *Attorney, Agent, or Firm* — Brian D. Graham; Charles A. Brill; Frank D. Cimino

(57) ABSTRACT

Techniques related to executing a plurality of instructions by a processor comprising a method for executing a plurality of instructions by a processor. The method comprises detecting a pipeline hazard based on one or more instructions provided for execution by an instruction execution pipeline, beginning execution of an instruction, of the one or more instructions on the instruction execution pipeline, stalling a portion of the instruction execution pipeline based on the detected pipeline hazard, storing a register state associated with the execution of the instruction based on the stalling, determining that the pipeline hazard has been resolved, and restoring the register state to the instruction execution pipeline based on the determination.

19 Claims, 8 Drawing Sheets

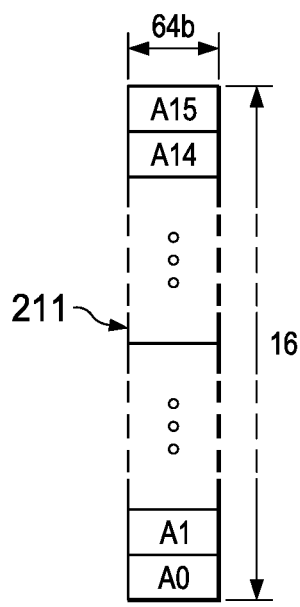
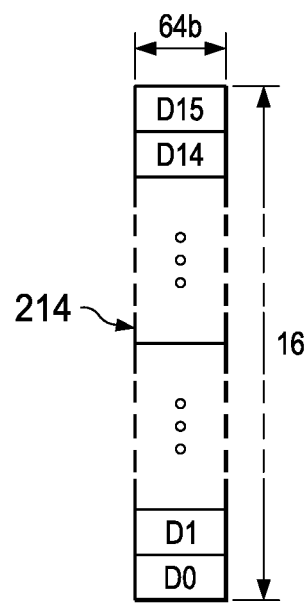
FIG. 3    FIG. 4
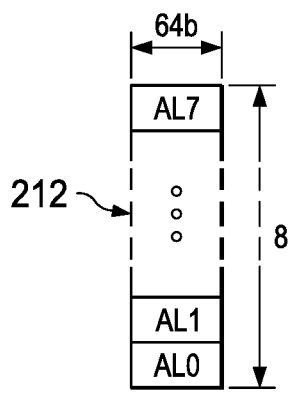
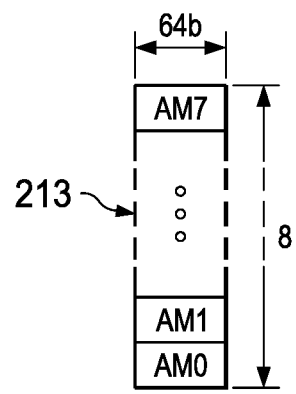
FIG. 5    FIG. 6

PIPELINE PROTECTION FOR CPUS WITH SAVE AND RESTORE OF INTERMEDIATE RESULTS

CROSS-REFERENCE TO RELATED APPLICATIONS

This application claims priority to U.S. Provisional Application No. 62/786,374, filed Dec. 29, 2018, which is hereby incorporated by reference.

BACKGROUND

Digital signal processors (DSP) are optimized for processing streams of data that may be derived from various input signals, such as sensor data, a video stream, a voice channel, radar signals, biomedical signals, etc. Digital signal processors operating on real-time data typically receive an input data stream, perform a filter function on the data stream (such as encoding or decoding) and output a transformed data stream. The system is called real-time because the application fails if the transformed data stream is not available for output when scheduled. Typical video encoding utilizes a predictable but non-sequential input data pattern. A typical application requires memory access to load data registers in a data register file and then supply data from the data registers to functional units which perform the data processing.

One or more DSP processing cores may be combined with various peripheral circuits, blocks of memory, etc. on a single integrated circuit (IC) die to form a system on chip (SoC). The advent of SOC architectures for embedded systems has created many challenges for the software development systems used to develop and debug software applications that execute on these architectures. These systems may include multiple interconnected processors that share the use of on-chip and off-chip memory. A processor may include some combination of instruction cache (ICache) and data cache (DCache) to improve processing. Furthermore, multiple processors, with memory being shared among them, may be incorporated in a single embedded system. The processors may physically share the same memory without accessing data or executing code located in the same memory locations or they may use some portion of the shared memory as common shared memory.

In early microprocessors, instruction execution was "atomic" in the sense that the processor fetched an instruction and completely executed it before fetching another and executing it, etc. Modern microprocessors typically execute instructions in several steps rather than atomically. This series of steps is called the "instruction execution pipeline", or just the "pipeline". Typically, a pipeline will include several phases, including steps to read the instruction from memory, decode the instruction, read the values to be operated on, perform the operation, and write the result to some kind of storage. This is called a "pipeline" because a processor can have several instructions executing at the same time in different phases, i.e. "in the pipeline". In this mode of operation, the processor can be fetching an instruction while it is decoding the previous instruction, while it is reading input values for an earlier instruction, etc. By overlapping the execution of instructions, we increase the rate at which the processor can execute instructions.

An implication of pipelining is that an instruction which is in the "read inputs" phase may need a value produced by an earlier instruction, but the "write" of that value has not happened yet. There are generally two ways to deal with this situation: either the processor looks for these situations and insert the appropriate stalls in the pipeline, or the programmer arranges the instructions such that this never happens by scheduling the dependent instructions far enough apart so that the situation doesn't arise. The former solution is generally called a "protected" pipeline, and the latter solution is called an "unprotected" pipeline. Almost all modern general-purpose architectures implement "protected" pipelines.

Protected pipelines have the advantage that they allow the CPU designers to deepen the pipeline in subsequent generations of the processor while still properly executing legacy code. However, protected pipelines generally require a great deal of logic to detect situations where delays should be inserted in the pipeline.

Unprotected pipelines have the advantage that they require little/no hardware to insert delays. The programmer or compiler is responsible for scheduling instructions such that instructions complete before their results are needed by subsequent instructions. Unprotected pipelines allow the use of "multiple-assignment" code, in which multiple writes to a particular register can be in the pipeline simultaneously. This is a very low-cost, low-complexity alternative to register renaming, and is useful for high performance low power digital signal processing (DSP) applications.

Existing processors are generally designed to have either protected or unprotected behavior.

SUMMARY

This disclosure relates generally to the field of DSPs. More particularly, but not by way of limitation, aspects of the present disclosure relate to replay buffers used to handle stalls and unprotected pipelines of a DSP. According to certain aspects, this disclosure relates to a method for executing a plurality of instructions by a processor. The method includes detecting a pipeline hazard based on one or more instructions provided for execution by an instruction execution pipeline. The method also includes beginning execution of an instruction, of the one or more instructions on the instruction execution pipeline. The method also includes stalling a portion of the instruction execution pipeline based on the detected pipeline hazard. The method also includes storing a register state associated with the execution of the instruction based on the stalling. The method also includes determining that the pipeline hazard has been resolved. The method also includes restoring the register state to the instruction execution pipeline based on the determination.

Another aspect of the present disclosure relates to a processor including an instruction execution pipeline having a plurality of pipeline stages. The processor further includes detection circuitry configured to detect a pipeline hazard based on one or more instructions provided for execution by the instruction execution pipeline. The processor further includes pipeline execution circuitry is configured to begin execution of an instruction, of the one or more instructions on the instruction execution pipeline. The processor further includes circuitry configured to stall a portion of the instruction execution pipeline based on the detected pipeline hazard. The processor further includes capture queue circuitry configured to store a register state associated with the execution of the instruction based on the stalling. The processor further includes circuitry configured to determine that the pipeline hazard has been resolved. The processor further includes circuitry configured to restore the register state to the instruction execution pipeline based on the determination.

Another aspect of the present disclosure relates to a processor including an instruction execution pipeline having a plurality of pipeline stages, scoreboarding circuitry configured to track a lifetime value associated with each of one or more instructions provided for execution, wherein the lifetime value is based on a number of processor cycles in which the respective instruction can be completed in, and an instruction execution pipeline controller. The instruction execution pipeline controller includes circuitry configured to detect a pipeline hazard based on the one or more instructions provided for execution by the instruction execution pipeline. The instruction execution pipeline controller also includes circuitry configured to trigger execution of an instruction, of the one or more instructions on the instruction execution pipeline. The instruction execution pipeline controller also includes circuitry configured to adjust the lifetime value for each processor cycle that the instruction is in the instruction execution pipeline. The instruction execution pipeline controller also includes circuitry configured to stall a portion of the instruction execution pipeline based on the detected pipeline hazard. The instruction execution pipeline controller also includes circuitry configured to suspend the adjusting of the lifetime value for the instruction. The instruction execution pipeline controller also includes circuitry configured to trigger storing a register state associated with the execution of the instruction based on the stalling. The instruction execution pipeline controller also includes circuitry configured to determine that the pipeline hazard has been resolved. The instruction execution pipeline controller also includes circuitry configured to trigger, after the determination that the pipeline hazard has been resolved, restoring of the register state to the instruction execution pipeline based on the lifetime value for the instruction.

BRIEF DESCRIPTION OF THE DRAWINGS

For a detailed description of various examples, reference will now be made to the accompanying drawings in which:

FIG. 3 illustrates a global scalar register file of the example processor.

FIGS. 4-6 illustrate local register files of the example processor.

DETAILED DESCRIPTION

Figure 1:
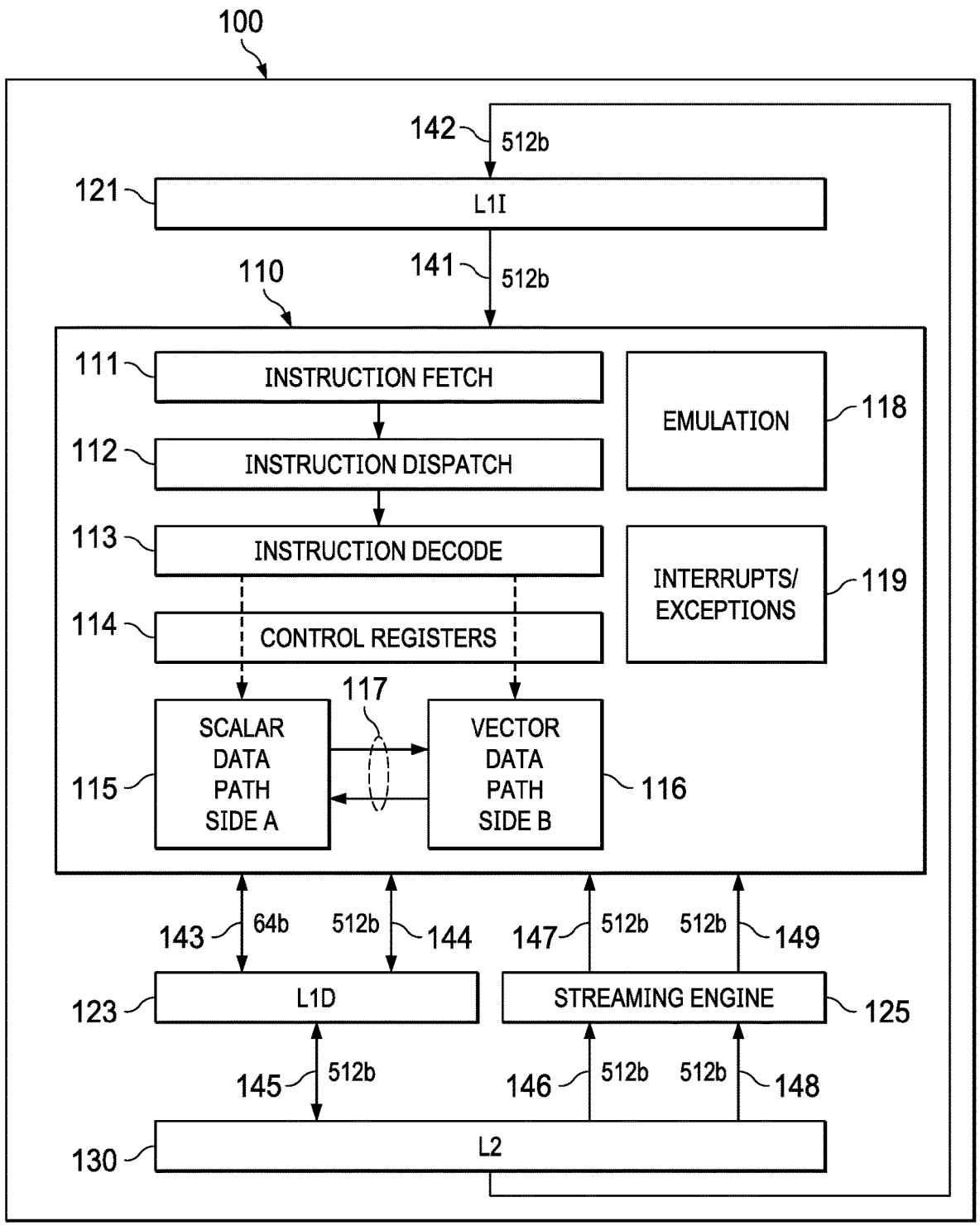
FIG. 1 illustrates an example processor having multiple data paths.

In the drawings, like elements are denoted by like reference numerals for consistency.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

Digital signal processors (DSP) are optimized for processing streams of data that may be derived from various input signals, such as sensor data, a video stream, a voice channel, radar signals, biomedical signals, etc. Memory bandwidth and scheduling are concerns for digital signal processors operating on real-time data. An example DSP processing core will be described hereinbelow that includes a streaming engine to improve processing efficiency and data scheduling.

One or more DSP processing cores may be combined with various peripheral circuits, blocks of memory, etc. on a single integrated circuit (IC) die to form a system on chip (SoC). See, for example, "66AK2Hx Multicore Keystone™ DSP+ARM® System-on-Chip," 2013, which is incorporated by reference herein.

Various embodiments of a processing core within a given family may have a different number of instruction pipeline stages, depending on a particular technology and cost/performance tradeoffs. The embodiment described here is representative and includes multiple pipelines stages.

FIG. 1 illustrates an example processor 100 that includes dual scalar/vector data paths 115, 116. Processor 100 includes separate level one instruction cache (L1I) 121 and level one data cache (L1D) 123. Processor 100 includes a L2 combined instruction/data cache (L2) 130 that holds both instructions and data. FIG. 1 illustrates a connection between L1I cache and L2 combined instruction/data cache 130, 512-bit bus 142. FIG. 1 illustrates a connection between L1D cache 123 and L2 combined instruction/data cache 130 by way of 512-bit bus 145. In this example of processor 100, L2 combined instruction/data cache 130 stores both instructions to back up L1I cache 121 and data to back up L1D cache 123. In this example L2 combined instruction/data cache 130 is further connected to higher level cache and/or main memory using known or later developed memory system techniques but not illustrated in FIG. 1. The size of L1I cache 121, L1D cache 123, and L2 cache 130 may be implemented in different sizes in various examples; in this example, L1I cache 121 and L1D cache 123 are each 32 kbytes, and L2 cache 130 is 1024 kbytes. In this example central processing unit core 110, L1I cache 121, L1D cache 123 and L2 combined instruction/data cache 130 are formed on a single integrated circuit. This single integrated circuit optionally includes other circuits.

Central processing unit core 110 fetches instructions from L1I cache 121 as controlled by instruction fetch unit 111. Instruction fetch unit 111 determines the next instructions to be executed and recalls a fetch packet sized set of such instructions. The nature and size of fetch packets are further detailed below. Instructions are directly fetched from L1I cache 121 upon a cache hit (if these instructions are stored in L1I cache 121). Upon a cache miss (the specified instruction fetch packet is not stored in L1I cache 121), these instructions are sought in L2 combined cache 130. In this example the size of a cache line in L1I cache 121 equals the size of a fetch packet, which is 512 bits. The memory locations of these instructions are either a hit in L2 combined cache 130 or a miss. A hit is serviced from L2 combined cache 130. A miss is serviced from a higher level of cache (not illustrated) or from main memory (not illustrated). In this example, the requested instruction is simultaneously supplied to both L1I cache 121 and central processing unit core 110 to speed use.

In this example, central processing unit core 110 includes plural functional units to perform instruction specified data processing tasks. Instruction dispatch unit 112 determines the target functional unit of each fetched instruction. In this example, central processing unit core 110 operates as a very long instruction word (VLIW) processor capable of operating on plural instructions in corresponding functional units simultaneously. A compiler may be used to organize instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 may operate on several instructions in parallel. The number of such parallel instructions is set by the size of the execute packet. This will be further detailed hereinbelow.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding are signals for control of the target functional unit to perform the data processing operation specified by the corresponding instruction on the specified data.

Central processing unit core 110 includes control registers 114. Control registers 114 store information for control of the functional units in scalar data path side A 115 and vector data path side B 116. This information may include mode information or the like.

The decoded instructions from instruction decode 113 and information stored in control registers 114 are supplied to scalar data path side A 115 and vector data path side B 116. As a result, functional units within scalar data path side A 115 and vector data path side B 116 perform instruction specified data processing operations upon instruction specified data and store the results in an instruction specified data register or registers. Each of scalar data path side A 115 and vector data path side B 116 include plural functional units that operate in parallel. These will be further detailed below in conjunction with FIG. 2. There is a data path 117 between scalar data path side A 115 and vector data path side B 116 permitting data exchange.

Central processing unit core 110 includes further non-instruction-based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Processor 100 includes streaming engine 125. Streaming engine 125 supplies two data streams from predetermined addresses typically cached in L2 combined cache 130 to register files of vector data path side B of central processing unit core 110. This provides controlled data movement from memory (as cached in L2 combined cache 130) directly to functional unit operand inputs.

FIG. 1 illustrates example data widths of busses between various parts. L1I cache 121 supplies instructions to instruction fetch unit 111 via bus 141. Bus 141 is a 512-bit bus in this example. Bus 141 is unidirectional from L1I cache 121 to central processing unit core 110. L2 combined cache 130 supplies instructions to L1I cache 121 via bus 142. Bus 142 is a 512-bit bus in this example. Bus 142 is unidirectional from L2 combined cache 130 to L1I cache 121.

L1D cache 123 exchanges data with register files in scalar data path side A 115 via bus 143. Bus 143 is a 64-bit bus in this example. L1D cache 123 exchanges data with register files in vector data path side B 116 via bus 144. Bus 144 is a 512-bit bus in this example. Busses 143 and 144 are illustrated as bidirectional supporting both central processing unit core 110 data reads and data writes. L1D cache 123 exchanges data with L2 combined cache 130 via bus 145. Bus 145 is a 512-bit bus in this example. Bus 145 is illustrated as bidirectional supporting cache service for both central processing unit core 110 data reads and data writes.

Processor data requests are directly fetched from L1D cache 123 upon a cache hit (if the requested data is stored in L1D cache 123). Upon a cache miss (the specified data is not stored in L1D cache 123), this data is sought in L2 combined cache 130. The memory locations of this requested data are either a hit in L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and central processing unit core 110 to speed use.

L2 combined cache 130 supplies data of a first data stream to streaming engine 125 via bus 146. Bus 146 is a 512-bit bus in this example. Streaming engine 125 supplies data of this first data stream to functional units of vector data path side B 116 via bus 147. Bus 147 is a 512-bit bus in this example. L2 combined cache 130 supplies data of a second data stream to streaming engine 125 via bus 148. Bus 148 is a 512-bit bus in this example. Streaming engine 125 supplies data of this second data stream to functional units of vector data path side B 116 via bus 149, which is a 512-bit bus in this example. Busses 146, 147, 148 and 149 are illustrated as unidirectional from L2 combined cache 130 to streaming engine 125 and to vector data path side B 116 in accordance with this example.

Figure 2:
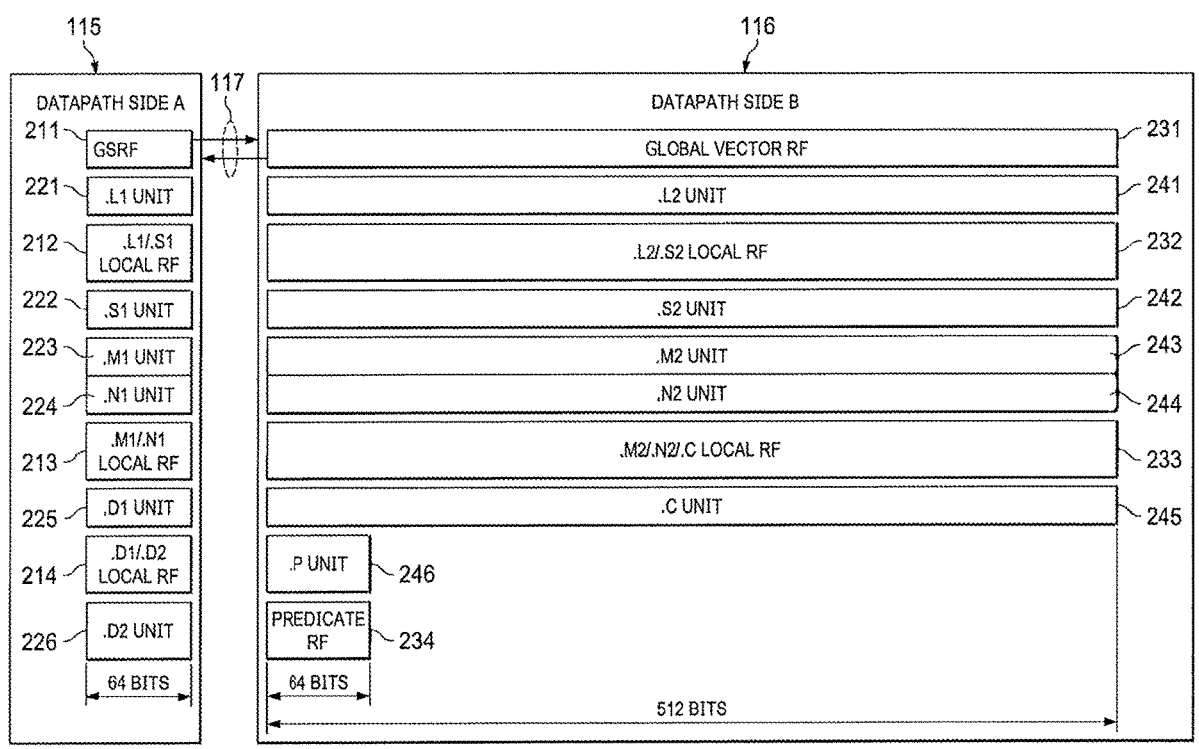
FIG. 2 illustrates details of functional units and register files of the example processor.

FIG. 2 illustrates further details of functional units and register files within scalar data path side A 115 and vector data path side B 116. Scalar data path side A 115 includes L1 unit 221, S1 unit 222, M1 unit 223, N1 unit 224, D1 unit 225 and D2 unit 226. Scalar data path side A 115 includes global scalar register file 211, L1/S1 local register file 212, M1/N1 local register file 213 and D1/D2 local register file 214. Vector data path side B 116 includes L2 unit 241, S2 unit 242, M2 unit 243, N2 unit 244, C unit 245 and P unit 246. Vector data path side B 116 includes global vector register file 231, L2/S2 local register file 232, M2/N2/C local register file 233 and predicate register file 234. There are limitations upon which functional units may read from or write to which register files. These will be described in more detail hereinbelow.

Scalar data path side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 may perform the following instruction selected operations: 64-bit add/subtract operations; 32-bit min/max operations; 8-bit Single Instruction Multiple Data (SIMD) instructions such as sum of absolute value, minimum and maximum determinations, circular min/max operations, and various move operations between register files. The result may be written into an instruction specified register of global scalar register file 211, L1/S1 local register file 212, M1/N1 local register file 213 or D1/D2 local register file 214.

Scalar data path side A 115 includes S1 unit 222. S1 unit 222 generally accepts two 64-bit operands and produces one 64-bit result. The two operands are each recalled from an instruction specified register in either global scalar register file 211 or L1/S1 local register file 212. In this example, S1 unit 222 performs the same type operations as L1 unit 221. In another example, there may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar data path side A 115 includes M1 unit 223. M1 unit 223 generally accepts two 64-bit operands and produces one 64-bit result. The two operands are each recalled from an instruction specified register in either global scalar register file 211 or M1/N1 local register file 213. In this example, M1 unit 223 performs the following instruction selected operations: 8-bit multiply operations; complex dot product operations; 32-bit count operations; complex conjugate multiply operations; and bit wise logical operations, moves, adds and subtracts. The result may be written into an instruction specified register of global scalar register file 211, L1/S1 local register file 212, M1/N1 local register file 213 or D1/D2 local register file 214.

Scalar data path side A 115 includes N1 unit 224. N1 unit 224 generally accepts two 64-bit operands and produces one 64-bit result. The two operands are each recalled from an instruction specified register in either global scalar register file 211 or M1/N1 local register file 213. In this example, N1 unit 224 performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar data path side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64-bits. D2 unit 226 is used for vector loads and stores of 512 bits. In this example, D1 unit 225 and D2 unit 226 also perform: swapping, pack and unpack on the load and store data; 64-bit SIMD arithmetic operations; and 64 bit wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector data path side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. In this example, L2 unit 241 performs instruction similar to L1 unit 221 except on wider 512-bit data. The result may be written into an instruction specified register of global vector register file 231, L2/S2 local register file 232, M2/N2/C local register file 233 or predicate register file 234.

Vector data path side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. In this example, S2 unit 242 performs instructions similar to S1 unit 222. The result may be written into an instruction specified register of global vector register file 231, L2/S2 local register file 232, M2/N2/C local register file 233 or predicate register file 234.

Vector data path side B 116 includes M2 unit 243. M2 unit 243 generally accepts two 512-bit operands and produces one 512-bit result. The two operands are each recalled from an instruction specified register in either global vector register file 231 or M2/N2/C local register file 233. In this example, M2 unit 243 performs instructions similar to M1 unit 223 except on wider 512-bit data. The result may be written into an instruction specified register of global vector register file 231, L2/S2 local register file 232 or M2/N2/C local register file 233.

Vector data path side B 116 includes N2 unit 244. N2 unit 244 generally accepts two 512-bit operands and produces one 512-bit result. The two operands are each recalled from an instruction specified register in either global vector register file 231 or M2/N2/C local register file 233. In this example, N2 unit 244 performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector data path side B 116 includes correlation (C) unit 245. C unit 245 generally accepts two 512-bit operands and produces one 512-bit result. The two operands are each recalled from an instruction specified register in either global vector register file 231 or M2/N2/C local register file 233.

Vector data path side B 116 includes P unit 246. Vector predicate (P) unit 246 performs basic logic operations on registers of local predicate register file 234. P unit 246 has direct access to read from and write to predication register file 234.

FIG. 3 illustrates global scalar register file 211. There are 16 independent 64-bit wide scalar registers designated A0 to A15. Each register of global scalar register file 211 can be read from or written to as 64 bits of scalar data. All scalar data path side A 115 functional units (L1 unit 221, S1 unit 222, M1 unit 223, N1 unit 224, D1 unit 225 and D2 unit 226) can read or write to global scalar register file 211. Global scalar register file 211 may be read from as 32 bits or as 64 bits and may only be written to as 64 bits. The instruction executing determines the read data size. Vector data path side B 116 functional units (L2 unit 241, S2 unit 242, M2 unit 243, N2 unit 244, C unit 245 and P unit 246) can read from global scalar register file 211 via cross path 117 under restrictions that will be detailed below.

FIG. 4 illustrates D1/D2 local register file 214. There are sixteen independent 64-bit wide scalar registers designated D0 to D15. Each register of D1/D2 local register file 214 can be read from or written to as 64 bits of scalar data. All scalar data path side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

FIG. 5 illustrates L1/S1 local register file 212. In this example, L1/S1 local register file 212 includes eight independent 64-bit wide scalar registers designated AL0 to AL7. In this example, the instruction coding permits L1/S1 local register file 212 to include up to 16 registers. In this example, only eight registers are implemented to reduce circuit size and complexity. Each register of L1/S1 local register file 212 can be read from or written to as 64 bits of scalar data. All scalar data path side A 115 functional units (L1 unit 221, S1 unit 222, M1 unit 223, N1 unit 224, D1 unit 225 and D2 unit 226) can write to L1/S1 local register file 212. Only L1 unit 221 and S1 unit 222 can read from L1/S1 local register file 212.

FIG. 6 illustrates M1/N1 local register file 213. In this example, eight independent 64-bit wide scalar registers designated AM0 to AM7 are implemented. In this example, the instruction coding permits M1/N1 local register file 213 to include up to 16 registers. In this example, only eight registers are implemented to reduce circuit size and complexity. Each register of M1/N1 local register file 213 can be read from or written to as 64 bits of scalar data. All scalar data path side A 115 functional units (L1 unit 221, S1 unit 222, M1 unit 223, N1 unit 224, D1 unit 225 and D2 unit 226) can write to M1/N1 local register file 213. Only M1 unit 223 and N1 unit 224 can read from M1/N1 local register file 213.

Figure 7:
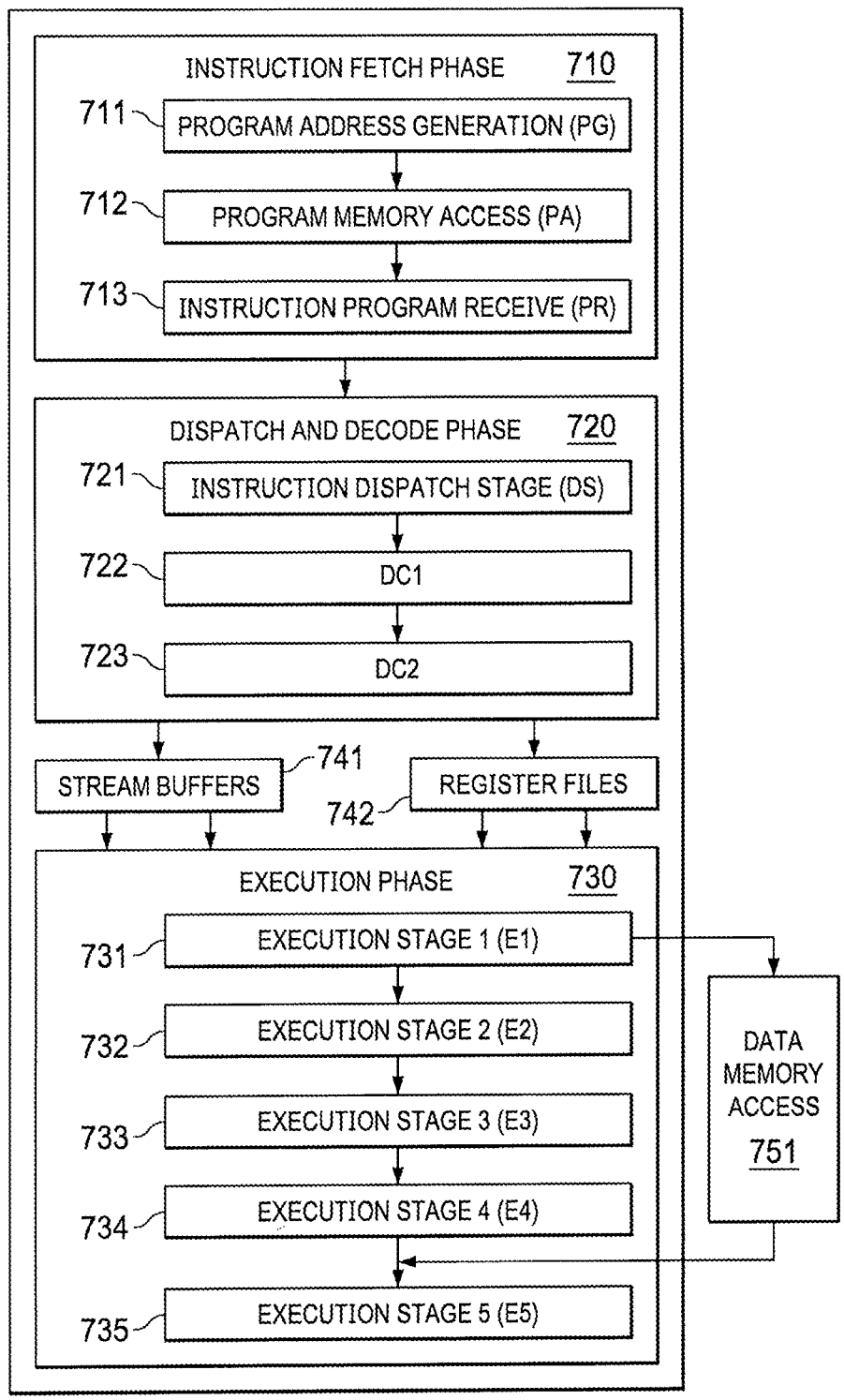
FIG. 7 illustrates pipeline phases of the example processor.

FIG. 7 illustrates the following pipeline phases: program fetch phase 710, dispatch and decode phases 720 and execution phases 730. Program fetch phase 710 includes three stages for all instructions. Dispatch and decode phases 720 include three stages for all instructions. Execution phase 730 includes one to five stages, depending on the instruction.

Fetch phase 710 includes program address generation (PG) stage 711, program access (PA) stage 712 and program receive (PR) stage 713. During program address generation stage 711, the program address is generated in the processor and the read request is sent to the memory controller for the L1I cache. During the program access stage 712 the L1I cache processes the request, accesses the data in its memory and sends a fetch packet to the processor boundary. During the program receive stage 713 the processor registers the fetch packet.

Central processor unit core 110 (FIG. 1) and L1I cache 121 pipelines (FIG. 1) are de-coupled from each other. Fetch packet returns from L1I cache can take a different number of clock cycles, depending on external circumstances such as whether there is a hit in L1I cache 121 or a hit in L2 combined cache 130. Therefore, program access stage 712 can take several clock cycles instead of one clock cycle as in the other stages.

The instructions executing in parallel constitute an execute packet. In this example, an execute packet can contain up to sixteen 32-bit wide slots for sixteen instructions. No two instructions in an execute packet may use the same functional unit. A slot is one of five types: 1) a self-contained instruction executed on one of the functional units of central processor unit core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instructions; 3) a branch instruction; 4) a constant field extension; and 5) a conditional code extension. Some of these slot types will be further explained hereinbelow.

Dispatch and decode phases 720 (FIG. 7) include instruction dispatch to appropriate execution unit (DS) stage 721, instruction pre-decode (DC1) stage 722, and instruction decode, operand read (DC2) stage 723. During instruction dispatch to appropriate execution unit stage 721, the fetch packets are split into execute packets and assigned to the appropriate functional units. During the instruction pre-decode stage 722, the source registers, destination registers and associated paths are decoded for the execution of the instructions in the functional units. During the instruction decode, operand reads stage 723, more detailed unit decodes are done, as well as reading operands from the register files.

Execution phase 730 includes execution (E1 to E5) stages 731 to 735. Different types of instructions require different numbers of these stages to complete their execution. These stages of the pipeline play an important role in understanding the device state at processor cycle boundaries.

During E1 stage 731 the conditions for the instructions are evaluated and operands are operated on. As illustrated in FIG. 7, E1 stage 731 may receive operands from a stream buffer 741 and one of the register files shown schematically as 742. For load and store instructions, address generation is performed, and address modifications are written to a register file. For branch instructions, branch fetch packet in PG phase is affected. As illustrated in FIG. 7, load and store instructions access memory here shown schematically as memory 751. For single-cycle instructions, results are written to a destination register file. This assumes that any conditions for the instructions are evaluated as true. If a condition is evaluated as false, the instruction does not write any results or have any pipeline operation after E1 stage 731.

During E2 stage 732 load instructions send the address to memory. Store instructions send the address and data to memory. Single-cycle instructions that saturate results set the SAT bit in the control status register (CSR) if saturation occurs. For 2-cycle instructions, results are written to a destination register file.

During E3 stage 733 data memory accesses are performed. Any multiply instructions that saturate results set the SAT bit in the control status register (CSR) if saturation occurs. For 3-cycle instructions, results are written to a destination register file.

During E4 stage 734 load instructions bring data to the processor boundary. For 4-cycle instructions, results are written to a destination register file.

During E5 stage 735 load instructions write data into a register. This is illustrated schematically in FIG. 7 with input from memory 751 to E5 stage 735.

As discussed above, processor 100 can be operated both in a protected mode and in an unprotected mode. In certain cases, pipeline protection may be enabled or disabled by setting a processor bit. For example, protection may be controlled by setting a particular bit. In certain cases, instructions may be used to set the protection modes, such as PROT or UNPROT.

Unprotected mode, or exposed pipeline mode, is the traditional VLIW operational mode. Unprotected mode requires the programmer or compiler to understand the latencies of the instructions and to insert NOPS or other instructions between dependent instructions to guarantee correctness. For example, a first instruction MPY32 A0, A1, A2; Multiply may be received by the processor. This instruction takes four processor cycles to execute and outputs to the A2 register. If the programmer or compiler wants to use the output of the MPY32 instruction for a second instruction, such as ADD A2, A8, A8; Accumulate, it is up to the programmer or compiler to insert three NOP instructions to obtain correct behavior. However, unexpected events, such as handling an interrupt or a cache miss, may cause the programmer or compiler inserted NOP instructions to be inaccurate.

In protected, or unexposed pipeline mode, the pipeline conforms to sequential operation model where dependent instructions are guaranteed to be correct, regardless of how many cycles it takes to complete the instructions. For an instruction which takes multiple cycles to complete, if a subsequent instruction attempts to read the destination of the first instruction within the delay slots of that first instruction, the CPU pipeline will automatically insert NOP cycles until the instruction which will write that register has completed. In the above example, if the processor 100 receives, in protected mode, the MPY32 instruction followed by the ADD instruction, the processor 100 would automatically insert three NOP cycles between the instructions.

Pipeline hazards may exist in certain processors, such as a multi-stage pipelined processor capable of processing multiple instructions in a pipeline. Unresolved pipeline hazards generally are conditions where a processor may produce undesired or unexpected results. Different types of pipeline hazards may exist. Two such types include data hazards and structural hazards. Data hazards generally are scenarios where an instruction executing in a pipeline refers to data from preceding instruction. Data hazards can result in race conditions if not handled. Generally, data hazards include a read after write and a write after write. Examples of data hazards include, but are not limited to, when a later in time instruction attempts to access a result of a previous instruction that is still being processed.

Structural hazards generally occur due to the structure of the datapath for a processor. Certain processors may be limited in the way writes are performed. In one such example, a single functional unit may be able to perform a single write to an output register file per clock cycle. In such processors, a structural hazard scenario may be presented when two instructions attempt to output their results to the same register in a single cycle. For example, in the case where a first instruction which takes two clock cycles to complete is executed on a functional unit, followed by a second instruction which takes one clock cycle to complete on the same functional unit, both instructions would complete and attempt to write to the output register file in the same cycle, with potentially unexpected and undesirable results.

In certain processors, when executing in protected mode, when a pipeline dependency is found, all of the functional units and entire execution pipeline from instruction fetch through the E1 stage may be stalled. As all functional units are stalled, no units are allowed to advance until the pipeline conflict has resolved. To help address pipeline hazards in both protected and unprotected modes, as well as enable recoverable interrupts and fast mode switching, capture queues may be used. The capture queue structures help save a state of a pipeline register and later write back the saved state, for example to continue execution or output to the general register file.

Figure 8:
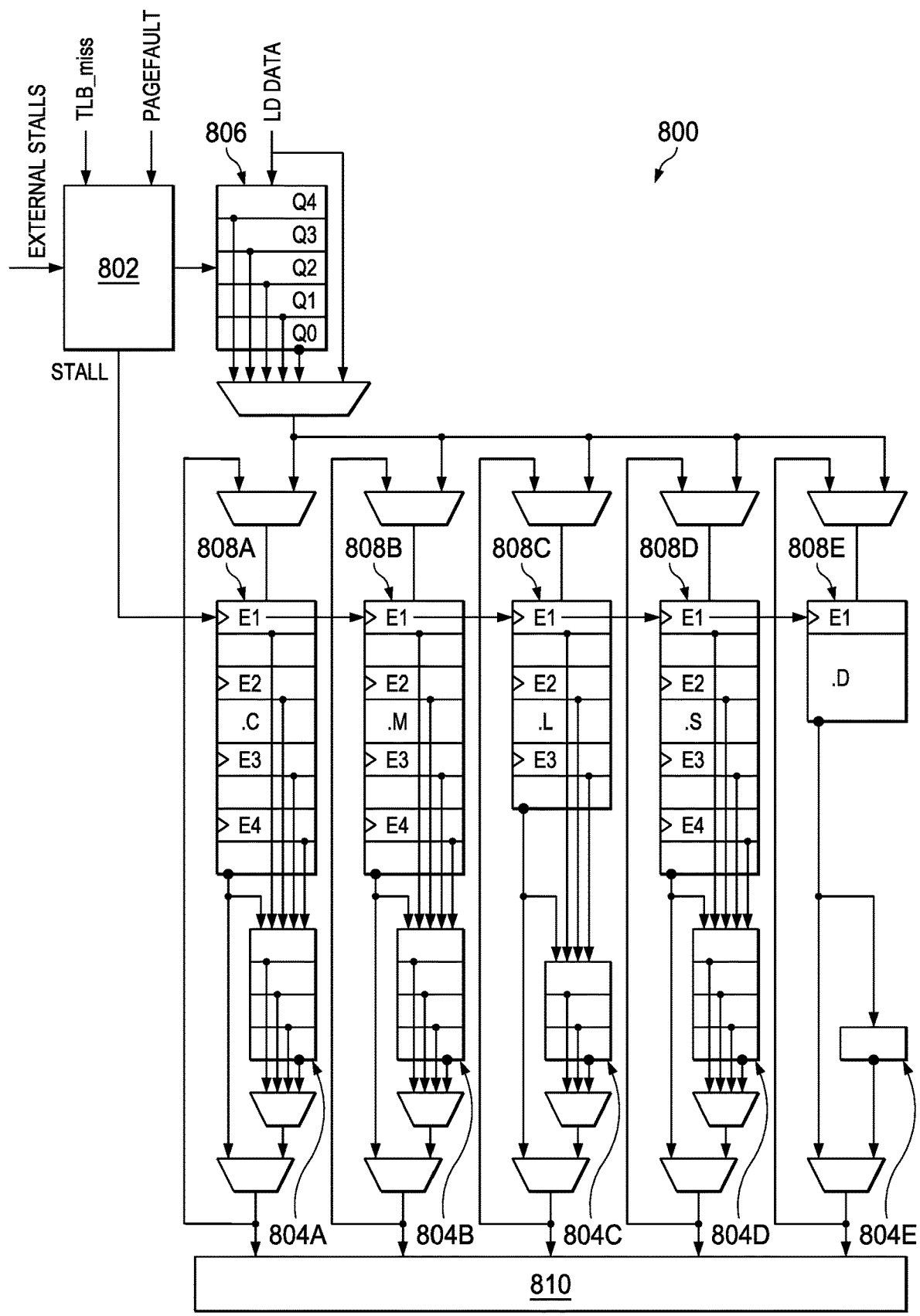
FIG. 8 is a circuit diagram illustrating example functional units and capture queues within the data path, in accordance with aspects of the current disclosure.

FIG. 8 is a circuit diagram 800 illustrating example functional units and capture queues within the data path, in accordance with aspects of the current disclosure. While shown in the context of a scalar datapath, in certain cases, capture queues may be utilized with both scalar and vector datapaths. Capture queues may be used to detect hazard conditions, generating appropriate stalls, and load and unload capture queue registers to help address pipeline hazards. According to certain aspects, capture queues may include a scoreboard 802 including hazard detection logic, local unit capture queues 804A-804E (collectively 804), and a central capture queue 806. The scoreboard 802 is coupled to an associated set of functional units 808A-808E (collectively 808) and the central capture queue 806. The functional units 808 may be each associated with a respective local unit capture queue 804.

When a hazarding condition is detected, the scoreboard 802 keeps track of whether a general purpose register 810 visible to an executing program contains a value that the general purpose register 810 is supposed to contain (e.g., the output associated with a particular instruction). If the scoreboard 802 sees that the general purpose register 810 does not yet have the appropriate value, it will watch out for the appropriate value and any other reference (read or write) to the general purpose register 810 will cause the scoreboard 802 to stall the pipeline. These inserted stalls are invisible to the program execution. For example, in the example discussed above, the scoreboard 802, in protected mode, may track whether the results of the MPY32 instruction is available in the general purpose register 810. As the ADD instruction uses a value from the general purpose register 810, the scoreboard, upon receiving the ADD instruction, will stall the pipeline, such as by inserting NOP instructions, until the results of the MPY32 instruction are available in the general purpose register 810. That is, processing continues on the MPY32 instruction while the ADD instruction is stalled waiting for the MPY32 instruction to complete. As processing of a portion of the ADD instruction, for example in the E1 stage, may have already been performed, any results of the processed portion of the ADD instruction and state of the E1 stage may be saved to the local unit capture queues 804. Once the MPY32 instruction completes, any results and state related to the ADD instruction saved to the local unit capture queues 804 may be restored and processing of the ADD may resume.

In another example, in protected mode, a hazard condition may be encountered when two instructions attempt to write to the same general register in the same cycle. As discussed above, the MPY32 instruction may take four cycles to complete, while the ADD instruction takes two cycles to complete. If the ADD instruction that outputs to the same general register as the MPY32 instruction is started two cycles after the MPY32 instruction, both instructions will complete on the same cycle and attempt to write to the same general register. This conflict may be detected by the scoreboard 802 and the output of the ADD instruction may be written from the E2 phase to the local unit capture queue 804. After the results of the MPY32 instruction are output to the general register, the results of the ADD instruction are copied from the local unit capture queue 804 to the general register. While the results of the ADD instruction are being held in the local unit capture queue, another instruction may be processed by the functional unit.

As another example, in unprotected mode, the scoreboard 802 may, after receiving an interrupt, help track and store register write results (e.g., as a functional unit is working on a result of a calculation). In the above example, while the ADD instruction is processing, an interrupt may be received. The scoreboard 802 may track the results of the ADD instruction as they would be accumulated into the general purpose register 810 and those results are saved to the local unit capture queues 804. In unprotected mode, the scoreboard 802 may set and maintain a lifetime value for each instruction. The lifetime value defines the expected lifetime of the instruction, based on the expected number of cycles needed for the functional unit to process the instruction. These lifetime values may be adjusted, such as by decrementing the value, for each clock cycle where the processor is not stalled. When the lifetime is equal to zero, then the results of the instruction are ready to be written back to the appropriate register file. If an instruction is interrupted before the lifetime has become zero, the instruction result and its corresponding lifetime is saved in order to maintain correct execution upon returning from the interrupt. This scoreboarding helps enable interrupt/event recovery by tracking where values from the local unit capture queues 804 should be restored.

In accordance with certain aspects, the scoreboard 802 may also track memory load operations which have not completed, such as those due to unexpected events in the memory system (for example, a cache miss). In certain cases, the scoreboard 802 may track up to a fixed number of (for example, up to eight) outstanding loads which have not completed before stalling a pipeline due to L1 D read data not being returned. Let it be assumed that in one example, the L1 D cache has a latency of 4 cycles. There are at least three general conditions that may result in a pipeline stall due to memory load conditions. First, in protected mode, if a destination of a load instruction is read as an operand to a subsequent instruction before a number of cycles needed for the L1 D data cache to return data, then the pipeline is stalled until the L1 D data cache returns data. Second, in either protected mode or unprotected mode, if the destination of a load instruction is read as an operand to an instruction, and the L1 D data cache indicates that it will not have the data by the 4 cycle L1 D cache latency, then the pipeline will stall. Third, if the processor has sent eight load instructions and data has not been returned for any of them, then the pipelines will stall when it encounters the next load instruction, provided it has not stalled already due to any of the above reasons.

Using the scoreboard 802 to track memory load behavior helps allow the processor to accept data returns from the memory system in any order. In certain cases, the processor can be configured to send a transaction identifier (ID) with each load instruction, and the L1 D can return the corresponding transaction ID with the load data. The scoreboard 802 may also allow the compiler to hoist load instructions further up in the schedule and to hide L1 D cache miss penalties when the compiler knows it has enough other work for the processor. In addition, the scoreboard 802 allows the L1D data cache to support hit-under-miss behavior, leading to possible performance improvements in code which has a mixture of loads which are likely to miss (such as large database item lookups), and loads that are likely to hit (such as stack accesses).

Figure 9:
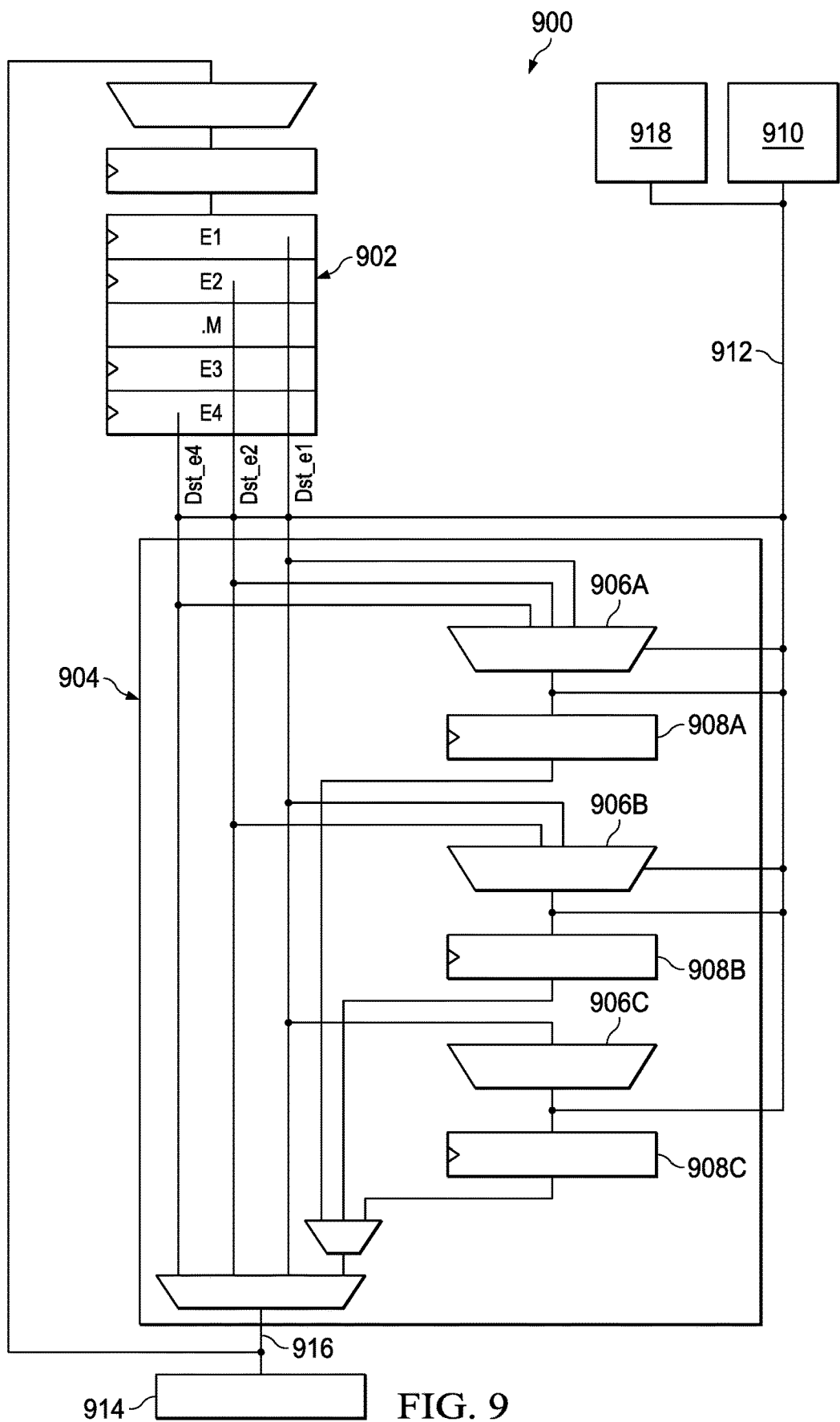
FIG. 9 illustrates an example functional unit, capture queue, and scoreboard complex, in accordance with aspects of the current disclosure

FIG. 9 illustrates an example functional unit, capture queue and scoreboard complex 900, in accordance with aspects of the current disclosure. A functional unit 902 of the complex 900, as shown, corresponds to the .M functional unit 808B from FIG. 8. The functional unit 902 includes four pipe stages and other functional units may include more or fewer pipe stages. Each pipe stage of functional unit 902 takes one clock cycle to complete. Each instruction can take a different number of cycles to process. For example, a first instruction may take two cycles to complete and the output thus comes from the E2 pipe stage. Each functional unit can produce a single write to the output register file 914 per clock cycle via a results bus 916. A local unit capture queue 904 helps to keep track of the pipeline register contents in a corresponding functional unit. Generally, there may be one local unit capture queue 904 per functional unit. Each pipe stage that can produce a result (here E1, E2, and E4) may be coupled to one or more MUX 906A-906C and capture queue registers 908A-908C of the local unit capture queue 904. Connecting pipe stages to multiple capture queue registers helps processing long series of instructions. For example, it is possible to have a series of instructions in a pipeline which would all attempt to write to the output register in the same clock cycle, such as a four cycle instruction, followed by a three cycle, then two cycle, and one cycle instructions. In such a case, the four cycle instruction would be written to the output register and the three cycle, two cycle, and one cycle instructions stored in capture queue registers 908A-908C.

The local unit capture queue 904 may operate in conjunction with the scoreboard 910. The scoreboard 910 is coupled to MUX 906A-906C and clock gate enables of the capture queue registers 908A-908C via bus 912. Scoreboard 910 maintains register bits corresponding to whether registers of a functional unit are working on producing a result. A bit corresponding to a register is high if the corresponding register of the functional unit is working on producing the result as the writeback value of the corresponding register. All the functional unit scoreboard tracking register writeback results then get OR'ed together at the top level to consolidate all registers usage per cycle. The scoreboard 908 then may make a set of comparisons. In certain cases, the scoreboard 908 may compare each read operand of each functional unit to detect potential read-after-write hazards in protected mode. For example, if .N src1 operand is register A1, and A1 will be written back by .M unit in two cycles, .N will detect if another instruction operand is attempting to read A1 and stall the instruction operand which reads A1 at E1 stage until the corresponding bit is set low. The corresponding bit may also be compared against the write address of every unit to detect Write-After-Write hazarding in protected mode. For example, if another functional unit, such as .L, is writing to A1, and A1 will be written back by .M functional unit in three cycles which is two cycles after the .L functional unit has done working to produce the A1 writeback value, then the hazarding logic is used to load the .L functional unit's local capture queue until .M is done writing A1 and the corresponding bit is set low. Then, the .L functional unit's local capture queue will unload the A1 value from its storage and put it on .L's output.

Figure 10:
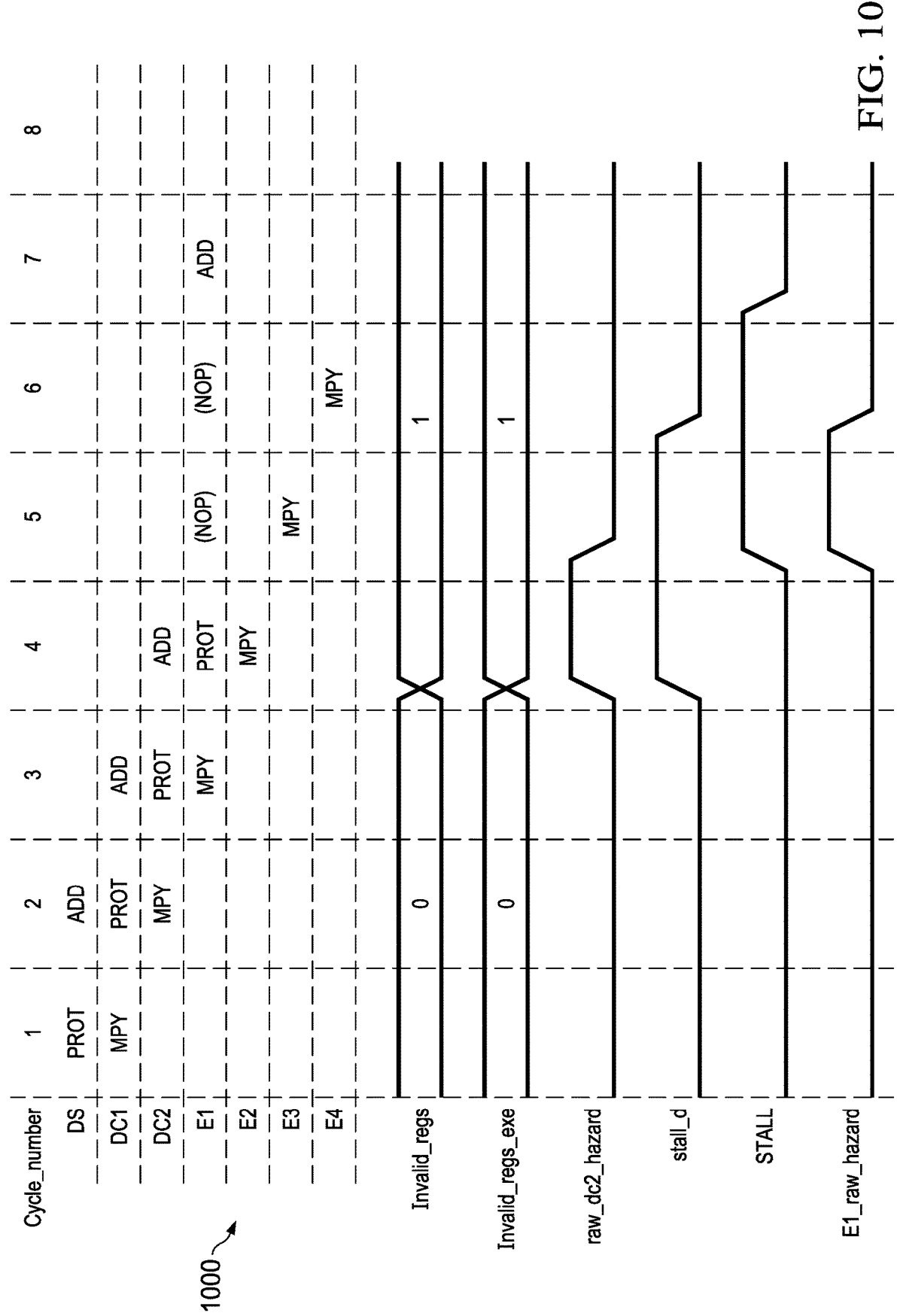
FIG. 10 is a timing diagram of an example capture queue scoreboard stall, in accordance with aspects of the present disclosure.

FIG. 10 is a timing diagram 1000 of an example capture queue scoreboard stall, in accordance with aspects of the present disclosure. Referring to the previous example of the MPY32 instruction followed by the ADD instruction, the MPY32 instruction is a four cycle instruction, therefore when the ADD instruction is at E1 stage, A0 doesn't have the correct value in it. Therefore, capture queue scoreboard needs to insert two stall cycles in between the MPY32 and the ADD instruction for the ADD instruction to hold until the MPY32 reaches its writeback before reading A0 value. To initiate the stall, the decoded DC2 read register address bits are compared with the invalid_regs bus and a hazard can be detected since 0th bit (register A0) is not an invalid register but DC2 read needs to read it. This is detected when the MPY32 is at E1 stage, the ADD is in DC2 stage (both corresponding to cycle 3 in this figure). A stall (e.g., NOP) is then issued from cycles 5 to 7, and the ADD is held in E1 stage for three cycles by writing the state of the E1 stage to a local unit capture queue. The MPY32 will continue to execute and its result is available at E4 stage (cycle 6). The state of the E1 stage is then restored from the local unit capture queue in cycle 7, the MPY32 result is forwarded to the ADD, and processing of the ADD continues.

As illustrated in FIG. 10, the capture queue structure also helps enable fast mode switching between protected mode and unprotected mode, and vice versa. Previously, certain processors could switch, for example between unprotected and protected modes, but generally, would stall the instructions after the switch command until all active instructions were finished. The capture queue helps allow switching from unprotected mode to protected mode, and vice versa, without clearing the pipeline or even stalling in certain cases. For example, while switching from unprotected mode to protected mode, the lifetime of any instructions already in the pipeline may be set to less than 0, such as −1, meaning that that the corresponding instruction should have already been committed to the register file. Hazarding logic, as described above, associated with protected mode then becomes active. In cycle 1 of FIG. 10, the processor pipeline executing the instructions illustrated is executing in unprotected mode. At cycle 4, the PROT command is executed in E1 stage and the pipeline is switched to protected mode. The lifetime of MPY is then set to −1. The lifetime for the ADD command is then set to the value normally associated with the ADD command as execution of the command has not yet begun. Execution of the ADD command then proceeds as normal as discussed above if the ADD command utilizes the A0 register that the MPY32 command is outputting to. In the case that the ADD command does not utilize the same registers as the MPY32 command, then the ADD command can be executed immediately after the PROT command without stalling the pipeline.

Figure 11:
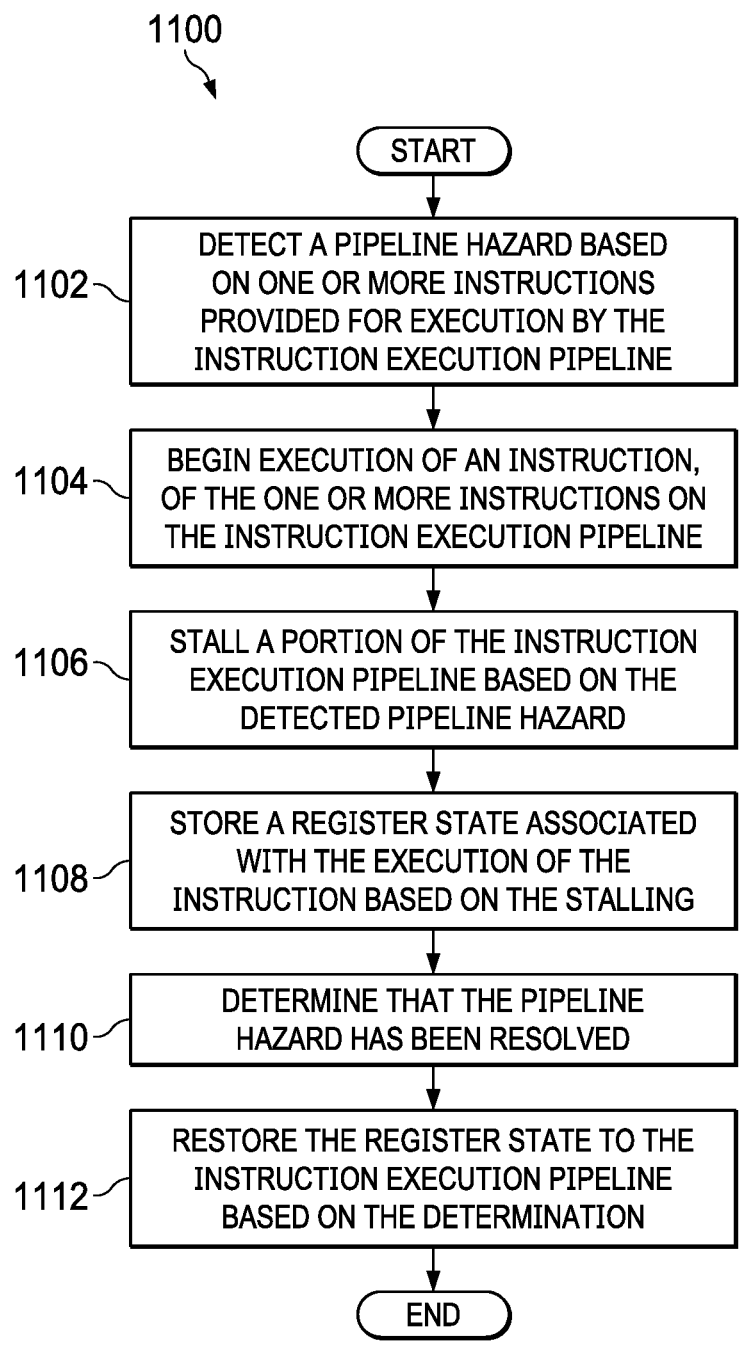
FIG. 11 is a flow diagram illustrating a technique for executing a plurality of instructions by a processor, in accordance with aspects of the present disclosure.

FIG. 11 is a flow diagram 1100 illustrating a technique for executing a plurality of instructions by a processor, in accordance with aspects of the present disclosure. At block 1102, a pipeline hazard is detected based on one or more instructions provided for execution by the instruction execution pipeline. For example, a scoreboard may determine that a first instruction will output a result to the same registers as a second instruction during the same processor cycle. At block 1104, execution of the instruction begins on the instruction execution pipeline. As an example, the instruction execution pipeline may begin execution of the instruction such as by passing the instruction into the E1 stage of a functional unit. At block 1106, a portion of the instruction execution pipeline is stalled based on the detected pipeline hazard. For example, the first instruction in the E1 stage of the functional unit may be stalled, while the second instruction in the E3 stage may continue executing. At block 1108, a register state for the stalled instruction is stored. As an example, the state of the execution of the instruction in the E1 stage may be stored to a capture queue. At block 1110, a determination is made that the pipeline hazard has been resolved. For example, the scoreboard may determine that the second instruction has finished executing. At block 1112, the register state is restored to the instruction execution pipeline based on the determination and execution of the instruction continues. For example, the state of the E1 stage may be restored from the capture queue to allow execution to continue.

Modifications are possible in the described embodiments, and other embodiments are possible, within the scope of the claims. While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A method for executing a set of instructions by a processor, the method comprising:
   executing a first instruction by an instruction execution pipeline;
   performing a first portion of execution of a second instruction by the instruction execution pipeline to produce an intermediate result;
   detecting a pipeline hazard for the second instruction based on the first instruction;
   based on the detected pipeline hazard:
      stalling a portion of the instruction execution pipeline; and
      storing the intermediate result of the second instruction in a capture queue;
   determining that the pipeline hazard has been resolved; and
   based on the pipeline hazard being resolved, restoring the intermediate result to the instruction execution pipeline.

2. The method of claim 1, further comprising:
   tracking a lifetime value associated with each instruction of the set of instructions, wherein the lifetime value is based on a number of processor cycles in which a respective instruction of the set of instructions can be completed.

3. The method of claim 2, wherein the tracking the lifetime value is based on adjusting the lifetime value for each processor cycle that the respective instruction of the set of instructions is in the instruction execution pipeline.

4. The method of claim 3, further comprising suspending the adjusting of the lifetime value for the second instruction based on the stalling of the portion of the instruction execution pipeline.

5. The method of claim 4, wherein the restoring is based on the lifetime value for the second instruction.

6. The method of claim 1, wherein:
   the execution of the first instruction continues during the stalling of the portion of the instruction execution pipeline;
   the method further comprises outputting a result of the execution of the first instruction; and
   the determination that the pipeline hazard has been resolved is based on the outputting.

7. The method of claim 1, further comprising storing a transaction identifier associated with the stored intermediate result, and wherein the restoring is based on the transaction identifier.

8. The method of claim 1, wherein the pipeline hazard is based on the second instruction using a result of the first instruction.

9. The method of claim 1, wherein the pipeline hazard is based on the first instruction and the second instruction each writing to a shared register.

10. A processor, comprising:
    an instruction execution pipeline having a plurality of pipeline stages configured to execute a first instruction and execute a second instruction during execution of the first instruction such that an intermediate result of the second instruction is produced;

a detection module coupled to the instruction execution pipeline and configured to detect a pipeline hazard for the second instruction caused by the first instruction;

a scoreboard module coupled to the instruction execution pipeline and the detection module and configured to stall a portion of the instruction execution pipeline responsive to the detected pipeline hazard; and a capture queue coupled to the instruction execution pipeline and the scoreboard module, and configured to store, in response to the detected pipeline hazard, the intermediate result associated with the execution of the second instruction;

wherein the scoreboard module is further configured to determine that the pipeline hazard has been resolved; and wherein the capture queue is further configured to restore the intermediate result to the instruction execution pipeline in response to the determination that the pipeline hazard has been resolved.

11. The processor of claim 10, wherein the scoreboard module is further configured to track a lifetime value associated with each instruction of a set of instructions that includes the first instruction and the second instruction, wherein the lifetime value is based on a number of processor cycles in which a respective instruction of the set of instructions can be completed in.

12. The processor of claim 11, wherein the tracking the lifetime value is based on adjusting the lifetime value for each processor cycle that the respective instruction of the set of instructions is in the instruction execution pipeline.

13. The processor of claim 12, wherein the scoreboard module is further configured to suspend the adjusting the lifetime value for the second instruction.

14. The processor of claim 13, wherein the restoring of the intermediate result to the instruction execution pipeline by the capture queue is based on the lifetime value for the second instruction.

15. The processor of claim 10, wherein the capture queue is associated with the instruction execution pipeline.

16. The processor of claim 10, wherein the instruction execution pipeline is further configured to:
continue execution of the first instruction while stalling the portion of the instruction execution pipeline; and
output a result of the execution of the first instruction, wherein the determination that the pipeline hazard has been resolved is based on the outputting.

17. The processor of claim 10, wherein the scoreboard module is further configured to store a transaction identifier associated with the stored intermediate result, and wherein the restoring is based on the transaction identifier.

18. A processor comprising:
an instruction execution pipeline having a plurality of pipeline stages;
a scoreboard module coupled to the instruction execution pipeline and configured to track a lifetime value associated with each instruction of a set of instructions, wherein the lifetime value is based on a number of processor cycles in which the respective instruction can be completed in; and
an instruction execution pipeline module configured to:
cause a first instruction of the set of instructions to be executed by the instruction execution pipeline;
cause a second instruction of the set of instructions to be executed by the instruction execution pipeline such that an intermediate result is produced;
detect a pipeline hazard for the second instruction based on the first instruction;
adjust the lifetime value for the second instruction for each processor cycle that the second instruction is in the instruction execution pipeline;
based on the detected pipeline hazard:
stall a portion of the instruction execution pipeline;
suspend the adjusting of the lifetime value for the second instruction; and
cause the intermediate result to be stored;
determine that the pipeline hazard has been resolved; and
trigger, after the determination that the pipeline hazard has been resolved, restoring of the intermediate result to the instruction execution pipeline based on the lifetime value for the second instruction.

19. The processor of claim 18, wherein the scoreboard module is further configured to store a transaction identifier associated with the stored intermediate result, and wherein the restoring is further based on the transaction identifier.

* * * * *